(12) United States Patent
Ikari et al.

(10) Patent No.: US 6,600,601 B1
(45) Date of Patent: Jul. 29, 2003

(54) POLARIZATION-INDEPENDENT OPTICAL ISOLATOR AND PRODUCTION METHOD THEREOF

(75) Inventors: Masanori Ikari, Annaka (JP); Toshihiko Ryuo, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/547,797

(22) Filed: Apr. 12, 2000

(30) Foreign Application Priority Data

Apr. 12, 1999 (JP) .......................... 11-103757
Apr. 27, 1999 (JP) .......................... 11-120068

(51) Int. Cl.$^7$ .............................. G02B 5/30
(52) U.S. Cl. .................. 359/484; 359/495; 359/496; 359/497; 359/281; 359/282; 359/501; 359/900; 372/703
(58) Field of Search ................. 359/484, 495, 359/496, 497, 281, 282, 501, 900; 372/703

(56) References Cited

U.S. PATENT DOCUMENTS

| 5,161,049 | A | * | 11/1992 | Tanno et al. |
| 5,452,122 | A | * | 9/1995 | Tsuneda et al. |
| 5,808,793 | A | * | 9/1998 | Chang et al. |
| 6,275,336 | B1 | * | 8/2001 | Yoshikawa et al. |

FOREIGN PATENT DOCUMENTS

| JP | B2-6158809 | | 12/1986 |
| JP | B2-6158811 | | 12/1986 |
| JP | B105908 | | 4/1989 |
| JP | 4246615 | A | * | 1/1991 |
| JP | A9138372 | | 5/1997 |
| JP | 11174382 | A | * | 12/1997 |
| JP | 410020247 | A | * | 1/1998 |
| JP | B2-2747775 | | 2/1998 |
| JP | 411052295 | A | * | 2/1999 |

* cited by examiner

Primary Examiner—Audrey Chang
Assistant Examiner—Craig Curtis
(74) Attorney, Agent, or Firm—Birch, Stewart, Kolasch & Birch, LLP

(57) ABSTRACT

A polarization-independent optical isolator includes a first birefringent wedge plate having an inclined plane directed to a light incoming side; a second birefringent wedge plate having an inclined plane directed to a light outgoing side, the wedge equal thickness line of the inclined plane of the second birefringent wedge plate being in parallel to the wedge equal thickness line of the inclined plane of the first birefringent wedge plate; and a Faraday rotator element disposed between the first and second birefringent wedge plates. A non-inclined plane of the first birefringent wedge plate is adhesively bonded to a light incoming plane of the Faraday rotator element, and a light outgoing plane of the Faraday rotator element is adhesively bonded to a non-inclined plane of the second birefringent wedge plate. The first and second birefringent wedge plates and the Faraday rotator element thus adhesively bonded to each other are disposed in a cylindrical magnet.

7 Claims, 7 Drawing Sheets

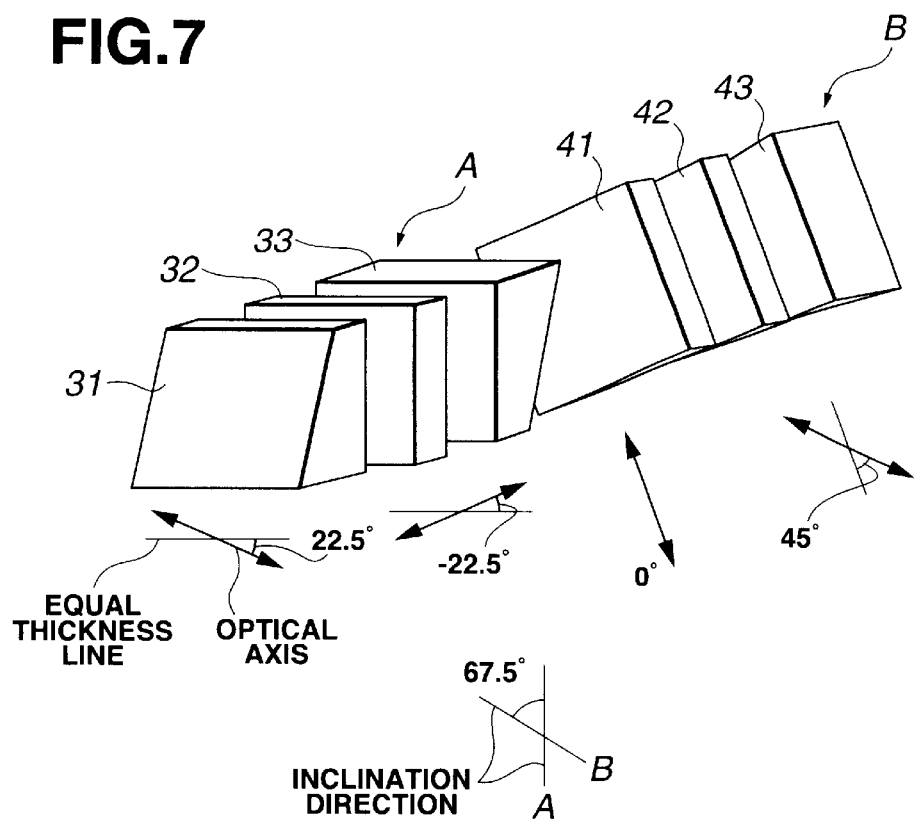
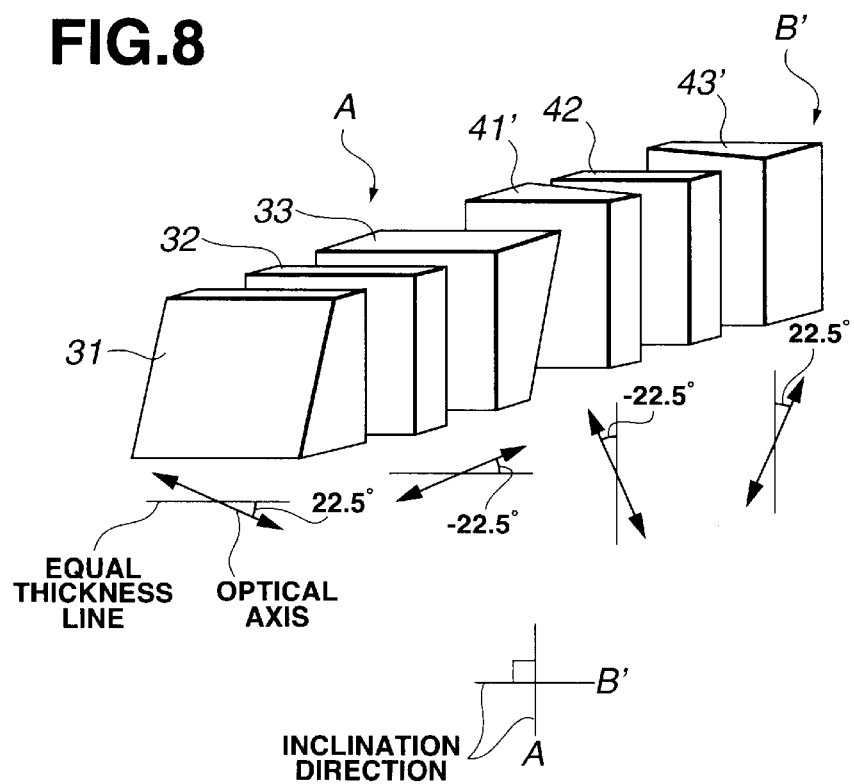

POLARIZATION-INDEPENDENT OPTICAL ISOLATOR AND PRODUCTION METHOD THEREOF

BACKGROUND OF THE INVENTION

The present invention relates to an optical isolator having a function of allowing signal light for optical communication to pass therethrough but not allowing return light due to reflection to pass therethrough, and particularly to a polarization-independent optical isolator capable of exhibiting its function for signal light irrespective of the polarization plane of the signal light.

In the case of long-distance transmission of light by way of fiber optics communication or in the case of branching light transmitted via an optical fiber into light parts, when the quantity of light is attenuated, the light is amplified by an erbium doped fiber amplifier (EDFA) or the like. The optical amplifier, which is intended to directly amplify signal light without converting a light signal into an electric signal, is composed of a number of optical components such as a lens, a mirror, a filter and the like. Accordingly, return light reflected from these optical components and/or return light from the optical fiber end occur in the optical amplifier, to generate resonance of light in the optical amplifier, which leads to deterioration of the amplifying characteristic. To cope with such an inconvenience, an optical isolator for cutting off return light due to reflection is used. On the other hand, since the polarization state of signal light passing through an optical fiber is not constant because of the effect of an external stress and a bending force applied to the optical fiber, the optical isolator may be desirable to be of a polarization-independent type which is not dependent on the polarization state of signal light.

The polarization-independent optical isolator includes, as described in Japanese Patent Publication No. Sho 61-58809, two birefringent wedge plates and one Faraday rotator element. Such a polarization-independent optical isolator has a high isolation characteristic and is suitable for miniaturization thereof.

For the purpose of attaining a higher isolation characteristic and reducing a polarization mode dispersion (PMD), a polarization-independent optical isolator having a configuration that two optical isolator units are arranged in series wherein the optical axis of the final stage birefringent plate of the first unit is perpendicular to the optical axis of the first stage birefringent plate of the second unit has been disclosed, for example, in Japanese Patent No. 2,747,775.

The above-described prior art optical isolator is assembled by a method including steps of joining optical elements to each other by using metal solder or low melting point glass, and a number of intermediate steps such as angle adjustment, which are inserted in the above joining steps. As a result, the assembly of the prior art optical isolator is very complicated and takes a lot of time and labor. A method of realizing reduction of cost, size, and the number of steps of an optical isolator has been disclosed, for example, in Japanese Patent Laid-open No. Hei 9-138372. Such a method involves preparing birefringent parallel flat plates each of which is long enough to be easily processed, more specifically, has a length equivalent to lengths of optical elements of a plurality of optical isolators; sticking optical planes of these birefringent plates to each other with an adhesive or the like; and cutting the birefringent plates thus integrated into chips of the optical isolators.

Meanwhile, the polarization-independent optical isolator using birefringent wedge plates is excellent in essential characteristics such as isolation characteristic; however, it is unsuitable for mass-production and becomes inexpensive because of special shapes of the wedge plates.

A two-stage optical isolator using birefringent taper plates has been disclosed, for example, in Japanese Patent No. 1393843, in which an optical isolator unit including a first 45° Faraday rotator disposed between first and second birefringent taper plates and an optical isolator unit including a second 45° Faraday rotator disposed between third and fourth birefringent taper plates are arranged in series, wherein the inclination direction of the first and second birefringent taper plates is offset 90° from the inclination direction of the third and fourth birefringent taper plates. Such a two-stage optical isolator is effective to give a high isolation characteristic. Japanese Patent Laid-open No. Hei 1-105908 has disclosed an optical isolator in which an optical isolator unit including a first 45° Faraday rotator disposed between first and second polarization isolation elements (including birefringent taper plates) and an optical isolator unit including a second 45° Faraday rotator disposed between third and fourth polarization isolation elements (including birefringent taper plates) are arranged in series, wherein the optical axis of the second polarization isolation element is offset 90° from the optical axis of the third polarization isolation element. Such an optical isolator is effective to give a significantly higher isolation characteristic, and the like. Further, an optical isolator intended to improve the PMD characteristic by combining the configurations of the above-described two kinds of the optical isolators with each other has been disclosed in Japanese Patent Publication No. 2747775.

The above-described two-stage optical isolator, however, has a disadvantage. Namely, the inclination direction of the birefringent taper plates of the first optical isolator unit is offset 90° from the inclination direction of the birefringent taper plates of the second optical isolator unit for ensuring the highest isolation characteristic; however, since compensation plates or the like are not used, an isolation distance between normal and abnormal light components of signal light in the forward direction becomes large, and accordingly, the signal light, which has been collimated after emerged from the optical fiber and has passed through the optical isolator, is restricted again by a lens, with a result that excess loss occurs when the signal light enters the optical fiber.

SUMMARY OF THE INVENTION

A first object of the present invention is to provide a polarization-independent optical isolator capable of enhancing the mass-production characteristic and realizing the cost reduction, and to provide a method of producing the polarization-independent optical isolator.

A second object of the present invention is to provide an optical isolator capable of enhancing the isolation characteristic, improving the PMD characteristic, and reducing the excess loss.

To achieve the first object, according to a first aspect of the present invention, there is provided a polarization-independent optical isolator including: a first birefringent wedge plate having an inclined plane directed to a light incoming side; a second birefringent wedge plate having an inclined plane directed to a light outgoing side, the wedge equal thickness line of the inclined plane of the second birefringent wedge plate being in parallel to the wedge equal thickness line of the inclined plane of the first birefringent wedge plate; and a Faraday rotator element disposed between the first and second birefringent wedge plates; wherein a non-inclined plane of the first birefringent wedge plate is adhesively bonded to a light incoming plane of the Faraday rotator element, and a light outgoing plane of the Faraday rotator element is adhesively bonded to a non-inclined plane of the second birefringent wedge plate; and the first and second birefringent wedge plates and the Faraday rotator element thus adhesively bonded to each other are disposed in a cylindrical magnet.

With this configuration, the light incoming plane and the light outgoing plane of the first birefringent wedge plate are formed of the inclined plane and non-inclined plane, respectively while the light incoming plane and the light outgoing plane of the second birefringent wedge plate are formed of the non-inclined plane and the inclined plane, respectively; the first and second birefringent wedge plates are arranged with their inclined planes directed outwardly; and the Faraday rotator element is held and adhesively bonded between the non-inclined planes of the first and second birefringent wedge plates. Accordingly, it is possible to solve the difficulty in assembly due to the wedge shaped parts, and to realize a significantly small-sized, easy-to-assemble structure without impairing the essential characteristics as the optical isolator.

In the above polarization-indepedent optical isolator, preferably, the cylindrical magnet is composed of two semi-cylindrical magnets each having an inner recess; and the first birefringent wedge plate, the Faraday rotator element, and the second birefringent wedge plate are fitted in and adhesively bonded to the two inner recesses of the two semi-cylindrical magnets, and simultaneously the two semi-cylindrical magnets are adhesively bonded to each other.

The first birefringent wedge plate and/or the second birefringent wedge plate are preferably made from a crystal of lithium niobate.

To achieve the first aspect, according to a second aspect of the present invention, there is provided a multi-stage polarization-independent optical isolator including: an even number of optical isolators assembled to each other, each of the optical isolators including a first birefringent wedge plate having an inclined plane directed to a light incoming side; a second birefringent wedge plate having an inclined plane directed to a light outgoing side, the wedge equal thickness line of the inclined plane of the second birefringent wedge plate being in parallel to the wedge equal thickness line of the inclined plane of the first birefringent wedge plate; and a Faraday rotator element disposed between the first and second birefringent wedge plates; wherein a non-inclined plane of the first birefringent wedge plate is adhesively bonded to a light incoming plane of the Faraday rotator element, and a light outgoing plane of the Faraday rotator element is adhesively bonded to a non-inclined plane of the second birefringent wedge plate; and the first and second birefringent wedge plates and the Faraday rotator element thus adhesively bonded to each other are disposed in a cylindrical magnet; wherein the crystal axes of those, opposed to each other, of the birefringent wedge plates are offset 90° with respect to the common center axis thereof in the light traveling direction; the wedge equal thickness line of the birefringent wedge plates of one of the plurality of optical isolators is offset a specific angle from the wedge equal thickness line of the birefringent wedge plates of another of the plurality of optical isolators; and the optical isolators are adhesively bonded to each other in a state in which a stepped portion provided at an end of the cylindrical magnet of one of the plurality of optical isolators is fitted to a stepped portion provided at an end of the cylindrical magnet of another of the plurality of optical isolators.

In the above multi-stage polarization-independent optical isolator, preferably, the cylindrical magnet is composed of two semi-cylindrical magnets each having an inner recess; and the first birefringent wedge plate, the Faraday rotator element, and the second birefringent wedge plate are fitted in and adhesively bonded to the two inner recesses of the two semi-cylindrical magnets, and simultaneously the two semi-cylindrical magnets are adhesively bonded to each other.

The specific angle is preferably 67.5°.

The first birefringent wedge plate and/or the second birefringent wedge plate are preferably made from a crystal of lithium niobate.

To achieve the first object, according to a third aspect of the present invention, there is provided a method of producing a polarization-independent optical isolator, including the steps of: preparing two wedge-shaped birefringent crystal bars each having a length of light incoming and outgoing planes, which extends in the wedge equal thickness line direction and is equivalent to lengths of a plurality of optical isolators, and also having an inclined plane as one of the light incoming and outgoing planes and a non-inclined plane as the other of the light outgoing and incoming planes, and a Faraday rotator element crystal bar having a length equivalent to the length of each of the birefringent crystal bars; holding and adhesively bonding light incoming and outgoing planes of the Faraday rotator element crystal bar between the non-inclined planes of the birefringent crystal bars; cutting the integral body of the birefringent crystal bar-Faraday rotator crystal bar-birefringent crystal bar formed at the holding and adhesively bonding step into a plurality of lengths each being equivalent to the length of one optical isolator, to form chips of the birefringent crystal-Faraday rotator crystal-birefringent crystal; and assembling each of the chips in a cylindrical magnet.

In the above method, preferably, the step of assembling each of the chips in the cylindrical magnet comprises a step of fitting the chip in an inner recess of one semi-cylindrical magnet, covering the chip with an inner recess of another semi-cylindrical magnet, and adhesively bonding the chip to the inner recesses and simultaneously adhesively bonding the semi-cylindrical magnets to each other.

To achieve the second object, according to a fourth aspect of the present invention, there is provided a two-stage polarization-independent optical isolator including: a first optical isolator unit including a first birefringent taper plate, a first 45° Faraday rotator, and a second birefringent taper plate which are arranged in this order; and a second optical isolator unit including a third birefringent taper plate, a second 45° Faraday rotator, and a fourth birefringent taper plate which are arranged in this order; wherein the first optical isolator unit and the second optical isolator unit are arranged in series in a light traveling direction in such a manner that the optical axis of the second birefringent taper plate is offset 90° from the optical axis of the third birefringent taper plate, and the inclination direction of the first and second birefringent taper plates is offset 67.5° from the inclination direction of the third and fourth birefringent taper plates.

The two-stage polarization-independent optical isolator having the above configuration is capable of enhancing the isolation characteristic and the PMD characteristic, and reducing the excess loss. In this optical isolator, since the crystal axes of the second and third birefringent taper plates are offset 90° from each other, of the light emerged from the second birefringent taper plate, a normal light component enters the third birefringent taper plate as an abnormal light component while an abnormal light component enters the third birefringent taper plate as a normal light component. As a result, a difference in transmission time between the normal and abnormal light components caused in the first optical isolator unit is canceled by a difference in transmission time caused in the second optical isolator unit, and consequently, the PMD becomes significantly small. Also, since the inclination direction of the birefringent taper plates of the first optical isolator unit is offset 67.5° from the inclination direction of the birefringent taper plates of the second optical isolator unit, it is possible to keep an isolation characteristic comparable to that obtained in the case of 90° offset which exhibits the highest isolation characteristic and also make smaller an isolation distance between the normal and abnormal light components of the light when the light is emerged from the second optical isolator unit as compared with the case of 90° offset, and hence to make smaller the excess loss caused when the light enters the optical fiber.

BRIEF DESCRIPTION OF THE DRAWINGS

FIG. 7 is a perspective view showing another embodiment of the two-stage polarization-independent optical isolator of the present invention;

FIG. 8 is a perspective view of a prior art two-stage polarization-independent optical isolator.

DETAILED DESCRIPTION OF THE PREFERRED EMBODIMENTS

Hereinafter, embodiments of polarization-independent optical isolators of the present invention will be described with reference to the drawings.

First, an embodiment of a single polarization-independent optical isolator will be described with reference to FIGS. 1 to 3.

Figure 1:
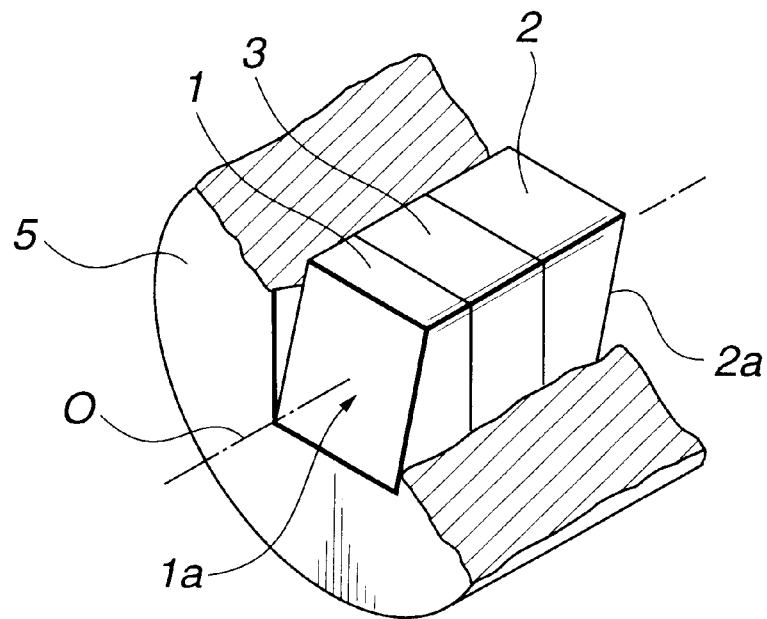
FIG. 1 is a perspective view, with parts partially cutaway, showing an embodiment of a polarization-independent optical isolator of the present invention.
Figure 2:
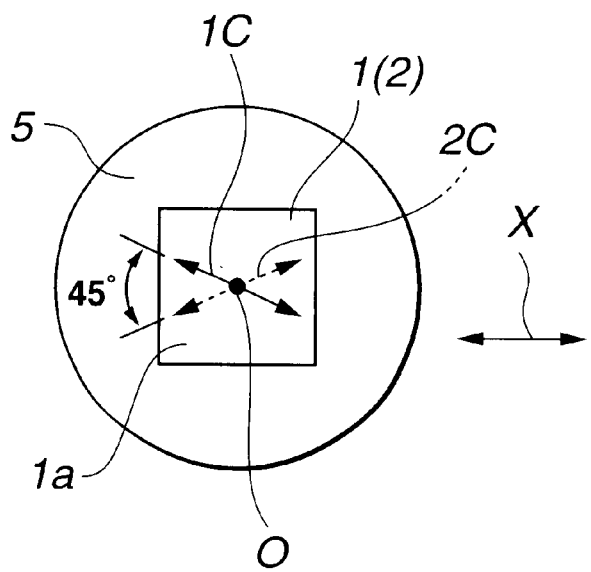
FIG. 2 is a front view of the optical isolator shown in FIG. 1.

Referring to FIG. 1, a single polarization-independent optical isolator in this embodiment is configured such that a first birefringent wedge plate 1, a Faraday rotator element 3, and a second birefringent wedge plate 2 are arranged in this order and are disposed in a cylindrical magnet 5. The first birefringent wedge plate 1 has one light transmission plane configured as an inclined plane 1a and the other light transmission plane configured as a non-inclined plane 1b; and the second birefringent wedge plate 2 has one optical transmission plane configured as an inclined plane 2a and the other light transmission plane configured as a non-inclined plane 2b. In addition, the equal thickness line of each of the inclined planes 1a and 2a of the first and second birefringent wedge plates 1 and 2 is parallel to the upper and lower sides of the wedge plate. An equal thickness line is a line passing through the wedge where the thickness intersected, while the line is moved in the transverse directions to the line, will always intersect an equal distance while within the wedge. An example of an equal thickness line is shown in FIGS. 7 and 8. Each of the first and second birefringent wedge plates 1 and 2 is made from a crystal of lithium niobate ($LiNbO_3$), which is finished such that the crystal axis thereof, that is, the optical axis thereof is offset 22.5° from the equal thickness line of the inclined plane. The Faraday rotator element 3 is configured to rotate the polarization plane of light counterclockwise by 45° with respect to the light traveling direction designated by character O.

In this optical isolator, since the first and second birefringent wedge plates 1 and 2 formed into the same shape have a posture relationship reversed in the vertical direction and turned over in the horizontal direction, the wedge equal thickness line of the inclined plane 1a and the wedge equal thickness line of the inclined plane 2a are parallel to each other along the direction shown by an arrow X. As shown in FIG. 2, which is a view seen from the light traveling direction O, the crystal axis 1C of the first birefringent wedge plate 1 is offset 22.5° from the equal thickness line direction X while the crystal axis 2C of the second birefringent wedge plate 2 is offset −22.5° from the equal thickness line direction X, and therefore, the crystal axes 1C and 2C are offset 45° from each other.

Figure 3:
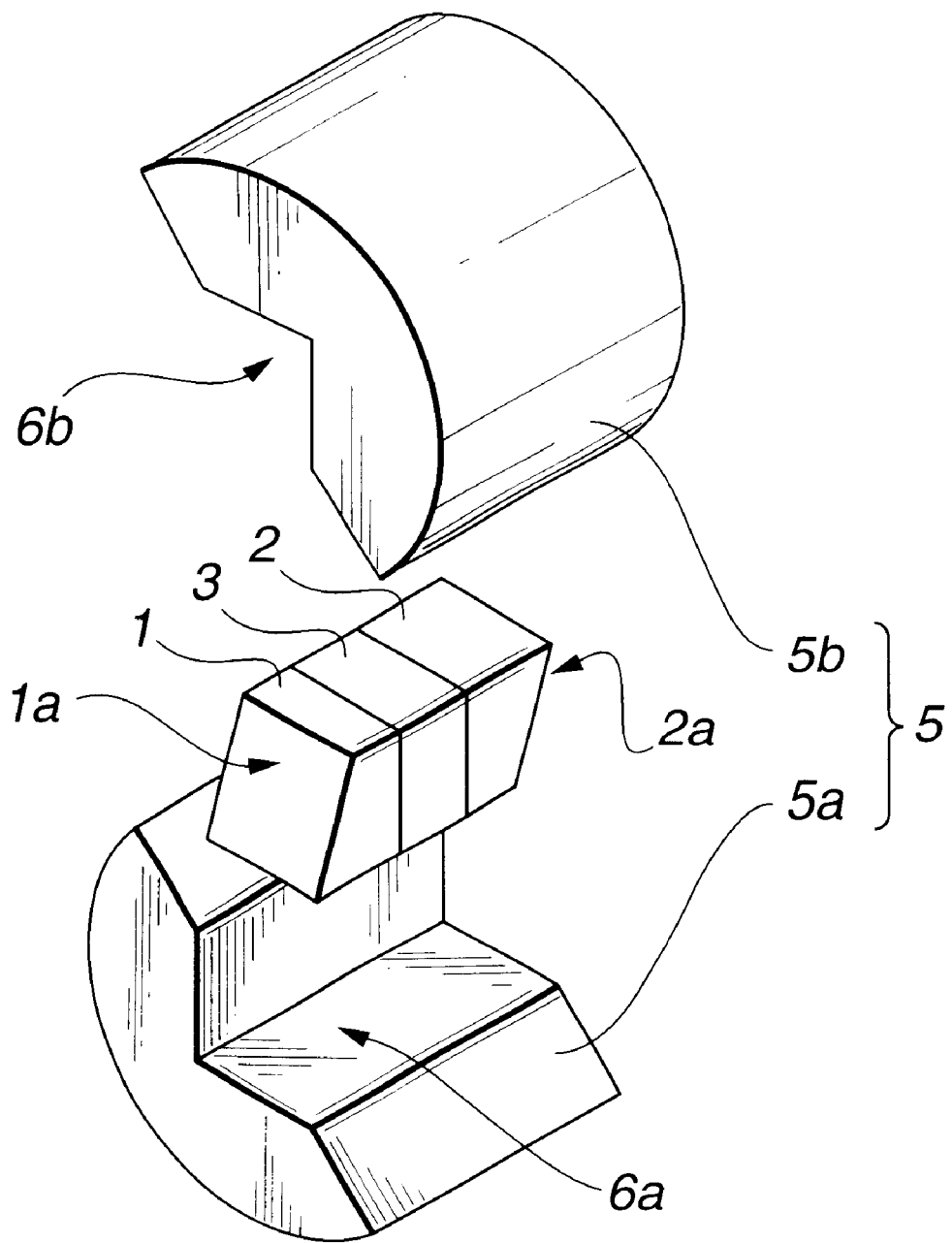
FIG. 3 is an exploded perspective view of the optical isolator shown in FIG. 1.

As shown in FIG. 3, the magnet 5 is composed of a semi-cylindrical magnet 5a formed into a semi-cylindrical shape having an L-shaped inner recess 6a and a semi-cylindrical magnet 5b formed into a semi-cylindrical shape having an L-shaped inner recess 6b. A chip formed by adhesively bonding the first birefringent wedge plate 1, the Faraday rotator element 3, and the second birefringent wedge plate 2 to each other is adhesively bonded between the L-shaped recesses 6a and 6b of the semi-cylindrical magnets 5a and 5b. In this way, the first birefringent wedge plate 1, the Faraday rotator element 3, and the second birefringent wedge plate 2 are fitted in the cylindrical magnet 5, to accomplish a polarization-independent optical isolator.

In this polarization-independent optical isolator, the first birefringent wedge 1, the Faraday rotator element 3, and the second birefringent wedge plate 2 are aligned in the forward direction, that is, the light traveling direction O.

Hereinafter, the operation of such a polarization-independent optical isolator will be described.

When non-polarized light traveling in the forward direction from a light source or an optical system for optical transmission enters the first birefringent plate 1, the light is isolated into normal and abnormal light components by the crystal axis 1C, and the polarization planes of the normal and abnormal light components are each rotated 45° counterclockwise with respect to the light traveling direction by the Faraday rotator element 3. The normal and abnormal light components pass through the second birefringent wedge plate 2 as they are because the crystal axis 2C is offset 45° from the crystal axis 1C and thereby the polarization planes of the normal and abnormal light components are not offset from the crystal axis 2C. Since the inclined plane 2a is parallel to the inclined plane 1a, when emerged from the inclined plane 2a, the normal and abnormal light components are collimated, to be synthesized into non-polarized light which travels to the next transmission optical system.

When light in the reversed direction caused by, for example, surface reflection of the next transmission optical system enters the second birefringent wedge plate 2, the light is isolated into normal and abnormal light components by the crystal axis 2C, and the polarization planes of the normal and abnormal light components are rotated 45° by the Faraday rotator element 3. In this case, the rotational direction of this light is the same as that of the light in the forward direction; however, since the traveling direction of this light is revered to that of the light in the forward direction, the rotational direction of the polarization planes of the normal and abnormal light components of this light becomes the clockwise direction as seen from the light traveling direction O. Accordingly, since the crystal axis 1C offset 45° from the crystal axis 2C is offset 90° from the polarization planes of the normal and abnormal light components, the normal and abnormal light components pass through the first birefringent wedge plate 1 as the abnormal and normal light components while being isolated from each other. The abnormal and normal light components are more isolated from each other by the function of the inclined plane 1a. As a result, there occurs no reflected light to be returned to the light source or optical system.

Next, an embodiment of a multi-stage polarization-independent optical isolator of the present invention will be described with reference to FIGS. 4 and 5.

Figure 4:
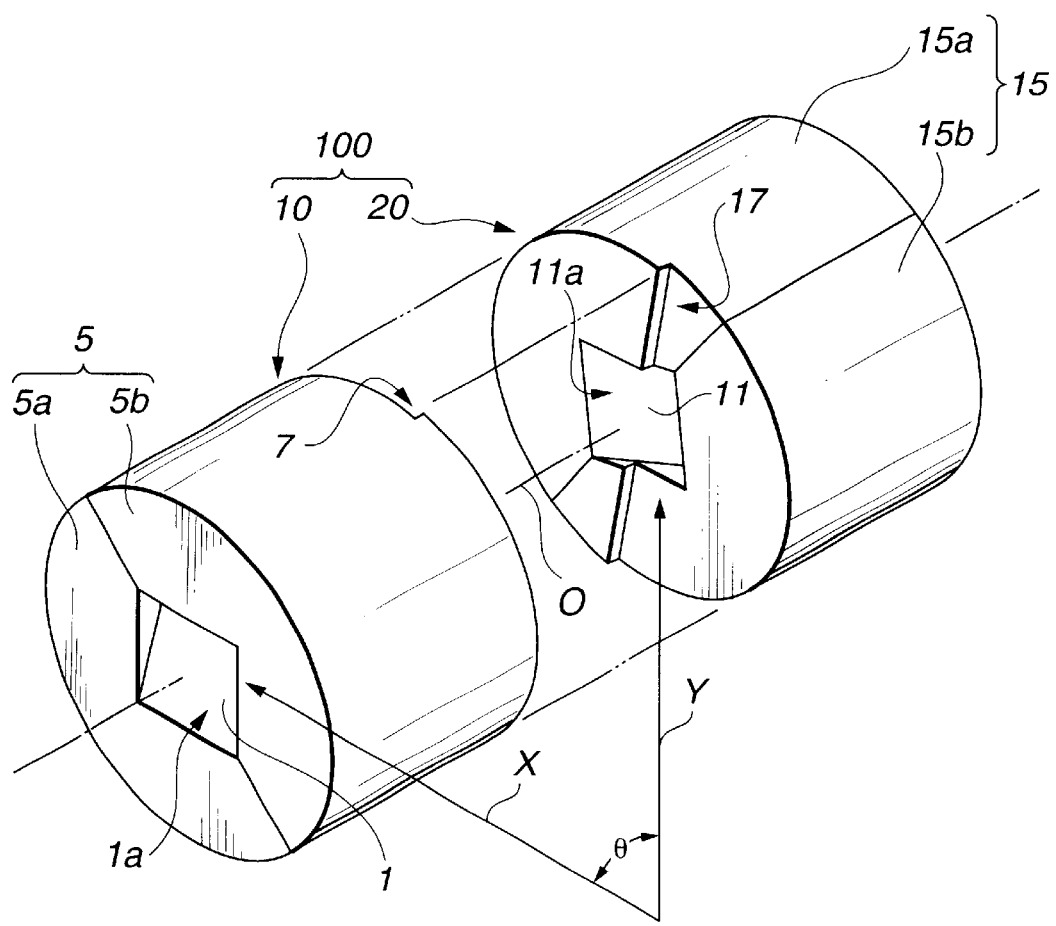
FIG. 4 is an exploded perspective view of an embodiment of a two-stage polarization-independent optical isolator of the present invention.

FIG. 4 is a perspective view of a multi-stage polarization-independent optical isolator of the present invention. In this optical isolator, optical isolators 10 and 20, each having a configuration in which a chip of a first birefringent wedge plate-a Faraday rotator element-a second birefringent wedge plate is fitted in a magnet, are assembled to each other.

The optical isolator 10 has the same configuration as that of the optical isolator shown in FIG. 3 except that a stepped portion 7 is provided at the rear end of the magnet 5 on the light outgoing side of the optical isolator 10. This different point, that is, the provision of the stepped portion 7 becomes more apparent by the comparison between the optical isolator 10 shown in FIG. 5 and the optical isolator shown in FIG. 2.

In the optical isolator 20, a first birefringent wedge plate 11 is finished such that a wedge equal thickness line direction Y is directed to the direction of a crystal axis 11C. Since a crystal axis 12C of a second birefringent wedge plate 12 is offset 45° from the crystal axis 11C and the wedge equal thickness line direction Y is the same as the direction of the crystal axis 11C of the first birefringent wedge plate 11, the crystal axis 12C is offset 45° from both the crystal axis 11C and the wedge equal thickness line direction Y. It should be noted that a Faraday rotator element in the optical isolator 20 is the same as the Faraday rotator element in the optical isolator 10.

A stepped portion 17, which is to be fitted to the stepped portion 7 in a state in which the wedge equal thickness line direction X of the birefringent wedge plates of the optical isolator 10 is offset 67.5° from the wedge equal thickness line direction Y of the birefringent wedge plates of the optical isolator 20, is provided at the front end of the magnet 15 on the light incoming side of the optical isolator 20. The optical isolators 10 and 20 are assembled by fitting the stepped portions 7 and 17 to each other and adhesively bonding the magnets 5 and 15 to each other.

Figure 5:
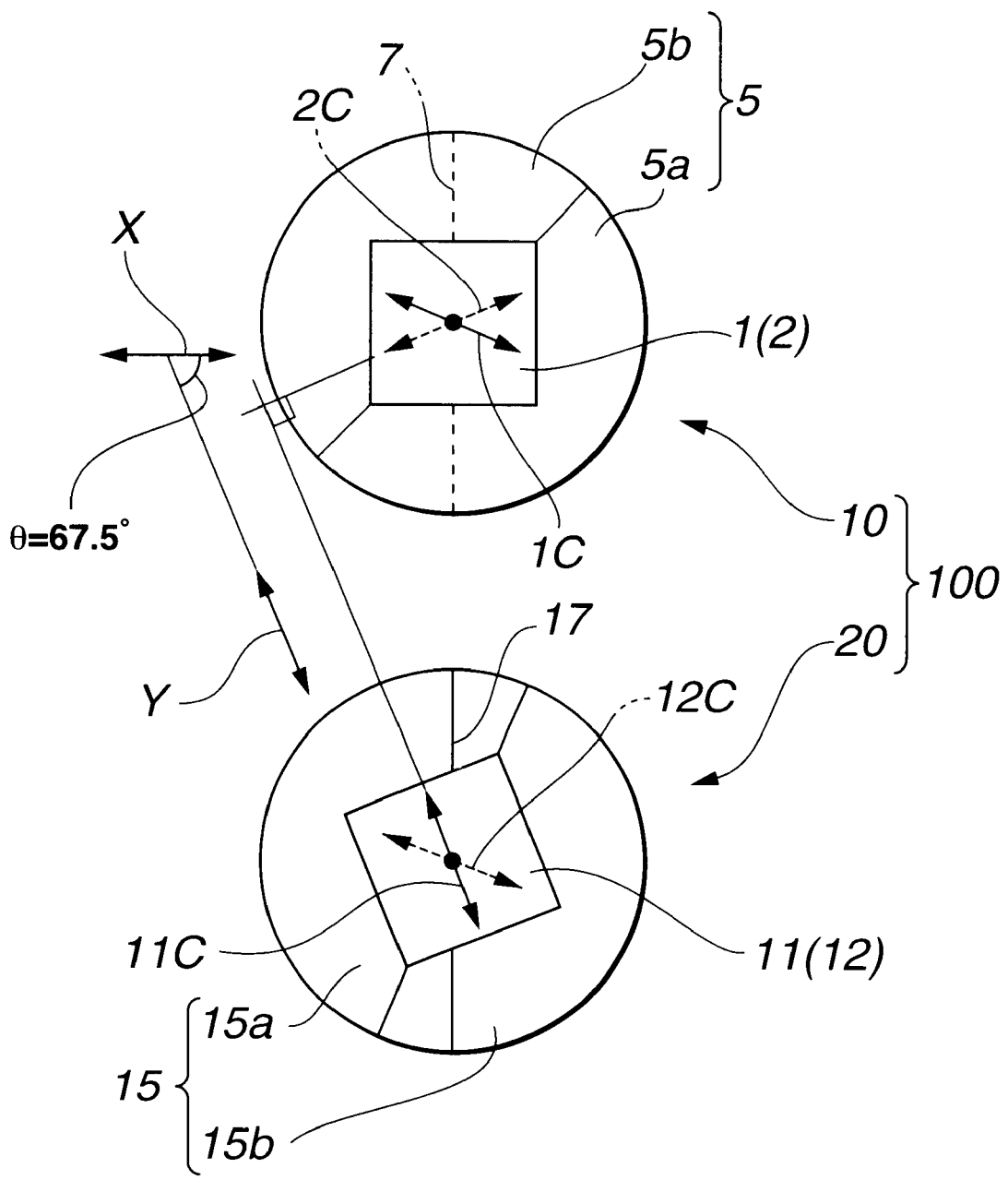
FIG. 5 is an exploded front view of the optical isolator shown in FIG. 4.

For an easy understanding of the directional characteristic of the optical isolators 10 and 20 of the multi-stage optical isolator 100, FIG. 5 shows the optical isolator 10 and the optical isolator 20 shifted in parallel to the optical isolator 10 along the light traveling direction O. The crystal axis 11C of the first birefringent wedge plate 11 of the optical isolator 20 is offset 90° from the crystal axis 2C of the second birefringent wedge plate 2 of the optical isolator 10. As a result, the crystal axis 12C of the second birefringent wedge plate 12 of the optical isolator 20 conforms to the crystal axis 1C of the first birefringent wedge plate 1 of the optical isolator 10. The wedge equal thickness line direction Y of the first birefringent wedge plate 11 (which is the same as the wedge equal thickness line direction of the second birefringent wedge plate 12) of the optical isolator 20 is offset a specific angle θ=67.5° from the wedge equal thickness line direction X of the first birefringent wedge plate 1 (which is the same as the wedge equal thickness line direction of the second birefringent wedge plate 2) of the optical isolator 10.

The operation of the multi-stage optical isolator 100 will be described below. Light in the forward direction emerged from the optical isolator 10 enters the optical isolator 20. At this time, since the crystal axis 11C of the first birefringent wedge plate 11 of the optical isolator 20 is offset 90° from the crystal axis 2C of the second birefringent wedge plate 2 of the optical isolator 10, of the light emerged from the second birefringent wedge plate 2, a normal light component enters the first birefringent wedge plate 11 as an abnormal light component while an abnormal light component enters the first birefringent wedge plate 11 as a normal light component. As a result, a difference in transmission time between the normal and abnormal light components caused in the optical isolator 10 is canceled by a difference in transmission time caused in the optical isolator 20, and consequently, the polarization mode dispersion (PMD) becomes significantly small. Also, since the wedge equal thickness line direction Y of the birefringent wedge plates of the optical isolator 20 is offset 67.5° from the wedge equal thickness line direction X of the birefringent wedge plates of the optical isolator 10, it is possible to keep an isolation characteristic comparable to that obtained in the case of 90° offset which exhibits the highest isolation characteristic while ensuring the above-described significantly reduced PMD characteristic. Further, in the multi-stage optical isolator of this embodiment, since the isolation distance between the normal and abnormal light components is smaller than that in the case of 90° offset, it is possible to make the excess loss caused when the light is made incident on the optical fiber smaller than that in the case of 90° offset.

Various multi-stage optical isolators can be obtained by assembling the above two-stage optical isolators of the number increased by a factor of an integer.

Next, an embodiment of a method of producing the polarization-independent optical isolator of the present invention will be described with reference to FIGS. 6A and 6B.

Figure 6A:
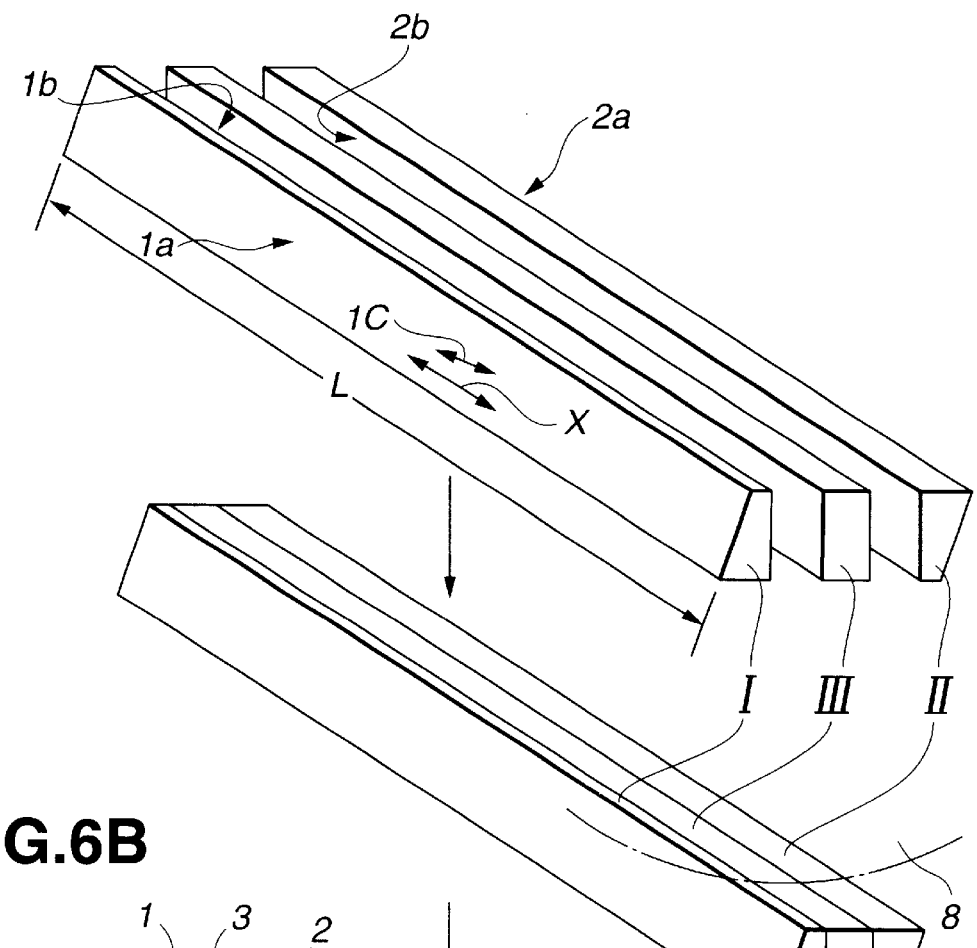
FIGS. 6A and 6B are perspective views showing an embodiment of a method of producing the polarization-independent optical isolator of the present invention.
Figure 6B:
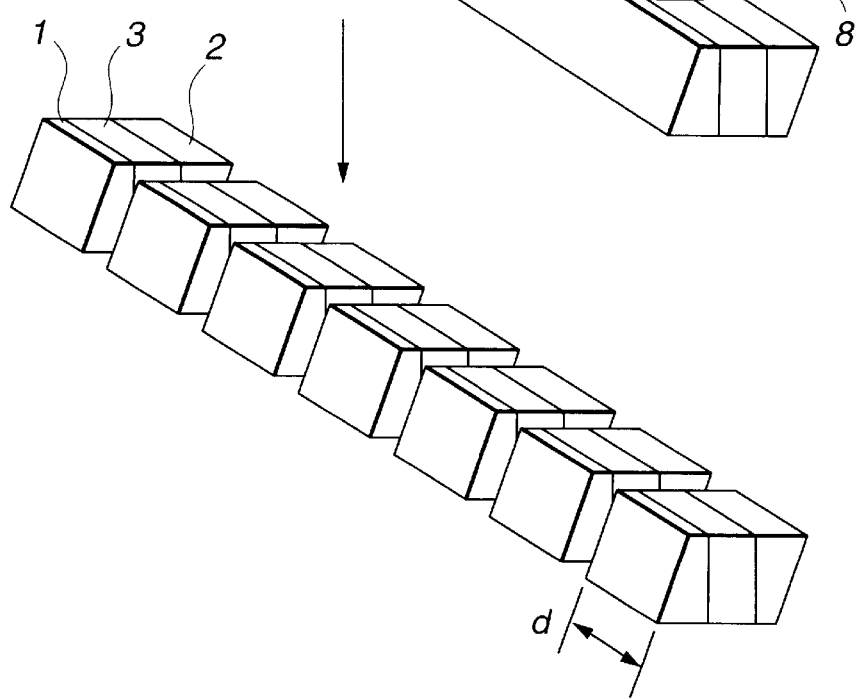

FIGS. 6A and 6B are perspective views, illustrating the sequential steps of the method of the producing the polarization-independent optical isolator of the present invention. Two birefringent crystal bars I and II made from the same material, and a Faraday rotator element crystal bar III are previously prepared. The birefringent crystal bar I is made from a crystal of lithium niobate, and is formed into a wedge shape having an inclined plane 1a and an upright plane (non-inclined plane) 1b. The length L of the birefringent crystal bar I is set to be equivalent to lengths of seven optical isolators in a wedge equal thickness line direction X in this embodiment shown in FIGS. 6A and 6B. In actual, however, the length L may be made as long as possible for shortening the processing time. The wedge equal thickness line direction X is set to be offset 22.5° from the direction of a crystal axis 1C. The inclined plane 1a and the non-inclined plane 1b are both finished by optical mirror-like surface polishing, and are coated with reflection preventive films. The configuration of the birefringent crystal bar II is the same as that of the birefringent crystal bar I. The Faraday rotator element crystal bar III is a square column of bismuth substitution rare earth-iron garnet, which has the same length of the birefringent crystal bars I and II. The planes, to be stuck to the birefringent crystal bars I and II, of the Faraday rotator element crystal bar III are finished by optical mirror-surface polishing, and are coated with reflection preventive films.

At the step shown FIG. 6A, the non-inclined planes 1b and 2b of the birefringent crystal bars I and II and the planes, to be stuck to the birefringent crystal bars I and II, of the Faraday rotator element crystal bar III are thinly coated with a thermosetting silicon resin, being stacked in the order of the birefringent crystal bar I, the Faraday rotator element crystal bar III, and the birefringent crystal bar II, and heated with a load applied thereto, to be thus adhesively bonded to each other. An integral body of the birefringent crystal bar I-Faraday rotator element crystal bar III-birefringent crystal bar II is thus obtained. At the step shown in FIG. 6B, the integral body is cut by a diamond cutter 8, to form seven chips each being composed of a birefringent crystal bar part 1, a Faraday rotator element crystal bar part 2, and a birefringent crystal bar part 3. Such a chip is, as shown in FIG. 3, fitted in the recess 6a of the semi-cylindrical magnet 5a, being covered with the recess 6b of the other semi-cylindrical magnet 5b, and is adhesively bonded thereto, to thus accomplish the optical isolator.

According to the above procedure, since a number of optical isolators can be produced at a time, it is possible to improve the material yield while eliminating waste of the materials, that is, the birefringent crystal and Faraday rotator element crystal and also significantly reduce the number of steps for one optical isolator, and hence to produce the optical isolators at a low cost.

To produce a chip of the first birefringent wedge plate 11-Faraday rotator element-second birefringent wedge plate 12, which constitutes the optical isolator 20 of the two-stage optical isolator 100 shown in FIG. 4, the birefringent crystal bar as the material of the first birefringent wedge plate 11 is cut such that the wedge equal thickness line direction Y conforms to the direction of the crystal axis 11C and the birefringent crystal bar as the material of the second birefringent wedge plate 12 is cut such that the wedge equal thickness line direction Y is offset 45° from the crystal axis 12C.

An example in which the optical isolator according to the embodiment shown in FIG. 1 was experimentally produced and the performances thereof were evaluated will be described below.

As each of the birefringent crystal bars I and II shown in FIGS. 6A and 6B, a crystal bar of lithium niobate having a width of 1.4 mm, a length of 20 mm, and a thickness of 600 μm was used. The inclined angle of the crystal bar was set at 13°. The inclined plane was coated with an air resisting AR coat of 1.55 μm band, and the non-inclined plane was coated with an adhesive resisting AR coat of 1.55 μm band. As the Faraday rotator element crystal bar III, a bismuth substitution rare earth-iron garnet having a width of 1.4 mm, a length of 20 mm, and a thickness of 500 μm was used. Both optical planes of the garnet were coated with an adhesive resisting AR coat. The optical planes of the Faraday rotator element crystal bar III were bonded to the birefringent crystal bars I and II with a thermosetting silicone resin, to prepare a base material for an optical isolator. The base material was cut into 12 pieces of chips each having a size of 1.4 mm×1.4 mm. The side surfaces of the chip were bonded to recesses 6a and 6b of semi-cylindrical SmCo based magnets 5a and 5b with the thermosetting silicone resin, and then the semi-cylindrical magnets were fixed to each other with an adhesive, to obtain an optical isolator.

The optical characteristics in average of the optical isolator thus obtained were as follows: the insertion loss was 0.08 dB or less; the isolation characteristic was 35 dB or more; and the PDL (polarization dependent loss) was 0.05 dB or less. These optical characteristics were comparable to those of the prior art optical isolator. On the other hand, due to the combination effect of increasing the material yield and reducing the number of steps, the production cost for one optical isolator was reduced to 60% of the production cost of the prior art optical isolator.

An example in which a two-stage optical isolator representative of the multi-stage optical isolator (see FIG. 4) was experimentally produced and the performances thereof were evaluated will be described below. An optical isolator 10 assembled in a magnet 5 having a stepped portion 7 was experimentally produced in the same procedure as that for the above-described experimentally produced optical isolator, and an optical isolator 20 assembled in a magnet 15 having a stepped portion 17 was experimentally produced in accordance with the same manner. The stepped portions 7 and 17 of the two optical isolators 10 and 20 were fitted to each other, and the two optical isolators 10 and 20 were bonded to each other with the thermosetting silicon resin. The optical characteristics in average of the two-stage optical isolator thus obtained were as follows: the insert loss was 0.20 dB or less; the isolation characteristic was 48 dB or more; and the PDL was 0.05 dB or less. The production cost for one optical isolator was significantly reduced as compared with the prior art optical isolator.

As described above, although the polarization-independent optical isolator and the production method thereof are intended to keep the essential optical characteristics such as the isolation characteristic by adopting birefringent crystals each having a special shape, that is, wedge shape, they are suitable for mass-production and are capable of increasing the material yield and reducing the number of steps, thereby significantly improving the performances as compared with the prior art optical isolator.

Next, another embodiment of the two-stage polarization-independent optical isolator of the present invention will be described with reference to FIG. 7.

Referring to FIG. 7, the two-stage optical isolator in this embodiment includes a first optical isolator unit A and a second optical isolator unit B which are coaxially aligned in series in the light traveling direction. The first optical isolator unit A has a first birefringent taper plate 31, a first 45° Faraday rotator 32, and a second birefringent taper plate 33 which are arranged in this order. The second optical isolator unit B has a third birefringent taper plate 41, a second 45° Faraday rotator 42, and a fourth birefringent taper plate 43 which are arranged in this order.

As the feature of the two-stage optical isolator of the present invention, the optical axis of the second birefringent taper plate 33 is offset 90° from the optical axis of the third birefringent taper plate 41, and the inclination direction of the first and second birefringent taper plates 31 and 33 is offset 67.5° from the inclination direction of the third and fourth birefringent taper plates 41 and 43.

To be more specific, in the two-stage optical isolator shown in FIG. 7, the optical axis of the first birefringent taper plate 31 is inclined +22.5° from the taper equal thickness line; the optical axis of the second birefringent taper plate 33 is inclined −22.5° from the taper equal thickness line; the optical axis of the third birefringent taper plate 41 is parallel to the taper equal thickness line; and the optical axis of the fourth birefringent taper plate 43 is inclined 45° from the taper equal thickness line.

In this embodiment shown in FIG. 7, since the inclined planes of the first and second birefringent taper plates 31 and 33 are directed outwardly in such a manner as to be parallel to each other, the optical axes of the first and second birefringent taper plates 31 and 33, which are inclined +22.5° and −22.5° from the equal thickness line respectively as described above, are offset 45° from each other: while since the inclined planes of the third and fourth birefringent taper plates 41 and 43 are directed outwardly in such a manner as to be parallel to each other, the optical axes of the third and fourth birefringent taper plates 41 and 43, which are inclined +0° and −45° from the equal thickness line respectively as described above, are offset 45° from each other. As a result, by interposing the 45° Faraday rotators 32 and 42 between the birefringent taper plates 31 and 33 and between the birefringent taper plates 41 and 43 respectively as shown in FIG. 7, a normal light component and an abnormal light component pass through each of the first and second isolator units A and B as they are.

Figure 9A:
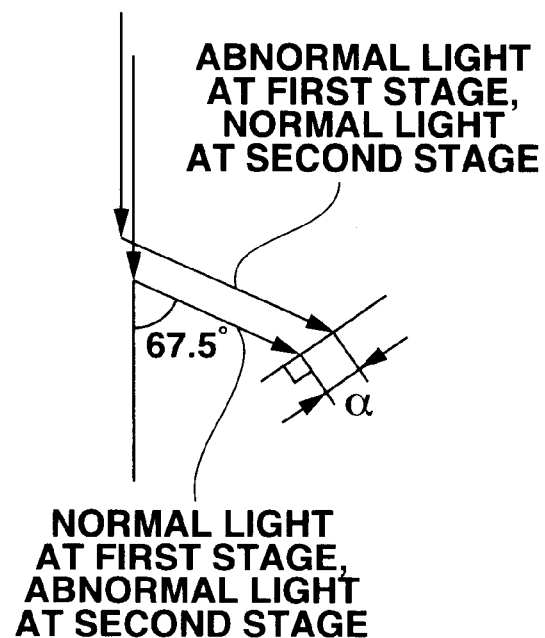
FIG. 9A is a diagram illustrating an isolation distance of the optical isolator of the present invention shown in FIG. 7.
Figure 9B:
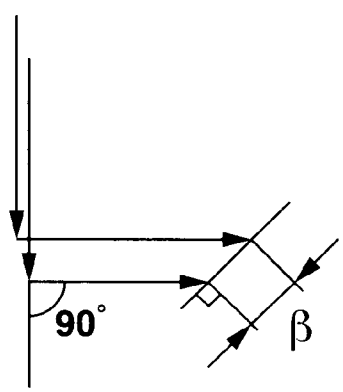
FIG. 9B is a diagram illustrating an isolation-distance of the prior art optical isolator shown in FIG. 8.

Further, in the embodiment shown in FIG. 7, by setting the first and second optical isolator units A and B in such a manner that the inclination direction of the first and second birefringent taper plates 31 and 33 arranged with their inclined planes being in parallel to each other is offset 67.5° from the inclination direction of the third and fourth birefringent taper plates 41 and 43 arranged with their inclined planes being in parallel to each other, the optical axis of the second birefringent taper plate is offset 90° from the optical axis of the third birefringent taper plate 41. As a result, a normal light component of signal light having passed through the first optical isolator unit A passes through the second isolator unit B as an abnormal light component, while an abnormal light component of the signal light having passed through the first optical isolator unit A passes through the second optical isolator unit B, thereby canceling the PMD and also, as shown in FIG. 9A, making small an isolation distance α between the two orthogonal polarized components, that is, the normal and abnormal light components of the signal light having passed through the optical isolators. For comparison, the configuration of the prior art two-stage optical isolator typically described in Japanese Patent No. 2747775 will be described with reference to FIG. 8. Referring to FIG. 8, the configuration of a first optical isolator unit A is the same as that of the optical isolator unit A shown in FIG. 7; however, a second optical isolator B' is configured such that third and fourth birefringent taper plates 41' and 43' whose optical axes are inclined −22.5° and +22.5° from the taper equal thickness line respectively are arranged in a state in which their inclined planes are directed inwardly in such a manner as to be parallel to each other, and further the first and second optical isolators A and B' are arranged in series in such a manner that the inclination of the birefringent taper plates 31 and 33 is offset 90° from the inclination direction of the birefringent taper plates 41' and 43'. Such a prior art optical isolator is capable of canceling the PMD because the optical axes of the second and third birefringent taper plates 33 and 41' are offset 90° from each other; however, since the inclination direction of the birefringent taper plates 31 and 33 is offset 90° from the inclination direction of the birefringent taper plates 41' and 43', as shown in FIG. 9B, an isolation distance β between the two orthogonal polarized components of the signal light having passed through the optical isolators becomes larger than the isolation distance α obtained by the optical isolator of the present invention in which the inclination direction of the birefringent taper plates 31 and 33 is offset 67.5° from that of the birefringent taper plates 41' and 43'.

It should be noted that the configuration of the optical isolator of the present invention except for the above-described feature may be the same as the known configuration, and the birefringent taper plates and the Faraday rotator may be the same as the known birefringent taper plates and Faraday rotator.

The effect of the two-stage optical isolator of the present invention will be more fully described with reference to the following experimental examples:

Inventive Example and Comparative Example

By using a single crystal of rutile having a size of 1.6 mm×1.6 mm×0.5 mm and having a taper angle of 4° as a material of birefringent taper plates, and a single crystal of bismuth substitution type iron magnetic garnet having a size of 1.6 mm×1.6 mm×0.5 mm as the material of a Faraday rotator, the optical isolator shown in FIG. 7 (Inventive Example) and the optical isolator shown in FIG. 8 (Comparative Example) were prepared. The optical characteristics of the samples were measured and compared with each other. The results are shown in Table 1.

TABLE 1

|  | Insert Loss (dB) | Isolation (dB) | PDL (dB) | PMD (dB) |  |
| --- | --- | --- | --- | --- | --- |
| 67.5° -(1) | 0.168 | 54 | ≦0.05 | ≦0.1 | Inventive |
| 67.5° -(2) | 0.132 | 59 | ≦0.05 | ≦0.1 | Example |
| 67.5° -(3) | 0.152 | 58 | ≦0.05 | ≦0.1 |  |
| 67.5° -(4) | 0.128 | 57 | ≦0.05 | ≦0.1 |  |
| Average | 0.145 | 57 |  |  |  |
| 90° -(1) | 0.181 | 56 | ≦0.05 | ≦0.1 | Comparative |
| 90° -(2) | 0.163 | 59 | ≦0.05 | ≦0.1 | Example |
| 90° -(3) | 0.203 | 57 | ≦0.05 | ≦0.1 |  |
| 90° -(4) | 0.156 | 57 | ≦0.05 | ≦0.1 |  |
| Average | 0.176 | 57 |  |  |  |

The data shown in table 1 showed that the isolation characteristic, PMD characteristic, and PDL characteristic of Inventive Example are substantially at the same level as those of Comparative Example; however, the insert loss characteristic of Inventive Example (67.5° offset) is smaller than that of Comparative Example (90° offset).

According to the two-stage polarization-independent optical isolator of the present invention is advantageous in that, of optical characteristics of a general two-stage optical isolator configured to cancel the PMD, the insert loss characteristic can be further improved.

While the preferred embodiments of the present invention have been described using the specific terms, such description is for illustrative purposes only, and it is to be understood that changes and variations may be made without departing from the spirit or scope of the following claims.

What is claimed is:

1. A multi-stage polarization-independent optical isolator comprising:

an even number of optical isolators assembled to each other, each of said optical isolators including a first birefringent wedge plate having an inclined plane directed to a light incoming side, having a first wedge equal thickness line; a second birefringent wedge plate having an inclined plane directed to a light outgoing side, having a second wedge equal thickness line, wherein said first wedge equal thickness line and said second wedge equal thickness line are parallel with respect to each other; and a Faraday rotator element disposed between said first and second birefringent wedge plates; wherein a non-inclined plane of said first birefringent wedge plate is adhesively bonded to a light incoming plane of said Faraday rotator element, and a light outgoing plane of said Faraday rotator element is adhesively bonded to a non-inclined plane of said second birefringent wedge plate; and said first and second birefringent wedge plates and said Faraday rotator element thus adhesively bonded to each other are disposed in a cylindrical magnet and where said first wedge equal thickness line defines the direction of a wedge equal thickness line of the birefringent wedge plates of one of said plurality of optical isolators of which said first birefringent wedge plate is a member;

wherein the crystal axes, of birefringent wedge plates directly opposed to each other, are offset 90° with respect to the common center axis thereof in the light traveling direction;

said wedge equal thickness line of the birefringent wedge plates of one of said plurality of optical isolators is offset a specific angle from the wedge equal thickness line of said birefringent wedge plates of another of said plurality of optical isolators; and said optical isolators are adhesively bonded to each other in a state in which a stepped portion provided at an end of said cylindrical magnet of one of said plurality of optical isolators is fitted to a stepped portion provided at an end of said cylindrical magnet of another of said plurality of optical isolators.

2. A multi-stage polarization-independent optical isolator according to claim 1, wherein said cylindrical magnet is composed of two semi-cylindrical magnets each having an inner recess; and said first birefringent wedge plate, said Faraday rotator element, and said second birefringent wedge plate are fitted in and adhesively bonded to said two inner recesses of said two semi-cylindrical magnets, and simultaneously said two semi-cylindrical magnets are adhesively bonded to each other.

3. A multi-stage polarization-independent optical isolator according to claim 1, wherein said specific angle is 67.5°.

4. A multi-stage polarization-independent optical isolator according to claim 1, wherein said first birefringent wedge plate and/or said second birefringent wedge plate are made from a crystal of lithium niobate.

5. A method of producing a polarization-independent optical isolator according to claim 3, wherein said step of assembling each of said chips in said cylindrical magnet comprises a step of fitting said chip in an inner recess of one semi-cylindrical magnet, covering said chip with an inner recess of another semi-cylindrical magnet, and adhesively bonding said chip to said inner recesses and simultaneously adhesively bonding said semi-cylindrical magnets to each other.

6. A method of producing a polarization-independent optical isolator, comprising the steps of:

preparing two wedge-shaped birefringent crystal bars, each having a wedge equal thickness line, each having a length of light incoming and outgoing planes, which extends in the wedge equal thickness line direction and is equivalent to lengths of a plurality of optical isolators, and also having an inclined plane as one of said light incoming and outgoing planes and a non-inclined plane as the other of said light outgoing and incoming planes, and a Faraday rotator element crystal bar having a length equivalent to said length of each of said birefringent crystal bars;

holding and adhesively bonding light incoming and outgoing planes of said Faraday rotator element crystal bar between said non-inclined planes of said birefringent crystal bars;

cutting said integral body of said birefringent crystal bar-Faraday rotator crystal bar-birefringent crystal bar formed at said holding and adhesively bonding step into a plurality of lengths each being equivalent to the length of one optical isolator, to form chips of said birefringent crystal-Faraday rotator crystal-birefringent crystal; and assembling each of said chips in a cylindrical magnet in which a stepped portion is provided at an end thereof, such that additional optical isolators can be fitted to said stepped portion.

7. A two-stage polarization-independent optical isolator comprising:

a first optical isolator unit including a first birefringent taper plate, a first 45° Faraday rotator, and a second birefringent taper plate which are arranged in this order; and a second optical isolator unit including a third birefringent taper plate, a second 45° Faraday rotator, and a fourth birefringent taper plate which are arranged in this order;

wherein said first optical isolator unit and said second optical isolator unit are arranged in series in a light traveling direction in such a manner that the optical axis of said second birefringent taper plate is offset 90° from the optical axis of said third birefringent taper plate, and the inclination direction of said first and second birefringent taper plates is offset 67.5° from the inclination direction of said third and fourth birefringent taper plates.

* * * * *